Nov. 11, 1947.  C. H. GUELL  2,430,565
POSITIVE SOUND TRACK IN MULTILAYER FILM
Filed Dec. 29, 1945
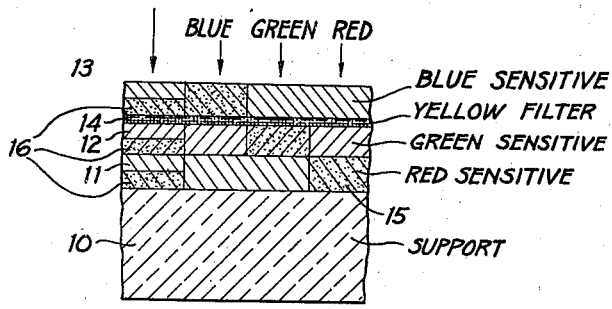
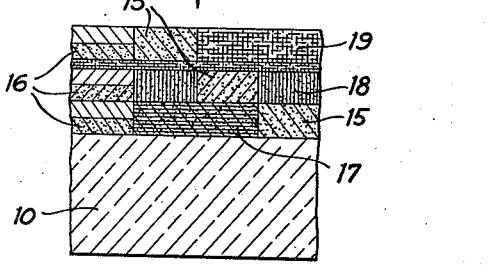
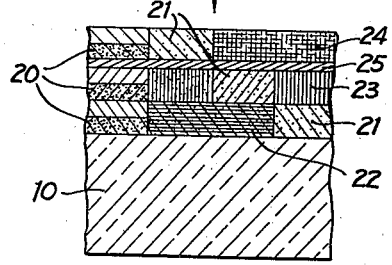
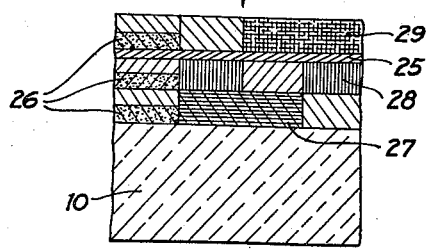
CHARLES H. GUELL
INVENTOR
BY
ATTORNEYS Patented Nov. 11, 1947

2,430,565

UNITED STATES PATENT OFFICE 2,430,565

POSITIVE SOUND TRACK IN MULTILAYER FILM

Charles H. Guell, Rochester, N. Y., assignor to Eastman Kodak Company, Rochester, N. Y., a corporation of New Jersey Application December 29, 1945, Serial No. 637,895

2 Claims. (Cl. 95—2)

This invention relates to photographic color films having sound tracks thereon and particularly to a method for producing sound records on such films.

It is well known that a positive sound track printed from a negative is capable of producing noticeably better sound reproduction than a track which is made by reversal in a photographic film. In multi-layer color films, it has hitherto been necessary, in general, to form the sound track by reversal. This places a severe limitation on the quality of the sound produced.

It is therefore the principal object of the present invention to provide a method for producing a positive sound track in a multi-layer photographic film which is processed by reversal. A second object is to provide a method for producing a silver sound record directly in multi-layer film rather than by reversal. A still further object is to provide a method for producing clean highlight in the sound record. Other objects will appear from the following description of our invention.

These objects are accomplished by the use of my method which in its broader aspects involves the printing of a negative sound record onto a multi-layer film followed by black and white development of both the sound track and picture areas of the film and edge fixing of the sound track areas so that the picture areas may be processed by reversal in the usual way.

The accompanying drawing is a flow chart showing in sectional form the film at various stages in my process.

A multi-layer film which is processed by reversal is described in Mannes, Godowsky and Wilder U. S. Patent 2,252,718, granted August 19, 1941, and my process may be applied to a film of this type. The multi-layer film described in the Mannes, Godowsky and Wilder patent has three superposed light-sensitive layers sensitive, respectively, to the red, green and blue spectral regions, the blue-sensitive layer being outermost or farthest from the support. After exposure and negative development of this film, the emulsion layers are separately exposed and color developed to produce reversed dye images of the proper color in the separate layers. The metallic silver and the coloring material, such as colloidal silver of the yellow filter layer, are then removed by converting the silver to silver ferricyanide and treatment of the film with hypo.

According to the present invention, the sound track is printed in one or more layers of the sound track area of the film from a negative sound record. The picture areas of the film are exposed in the usual way to a positive scene or image. The sound track and picture areas are developed in the usual way in a normal black and white developer to produce negative silver images in the picture areas and a positive sound track record in the sound track area. Residual undeveloped silver halide is present in both the picture and sound track areas of the film at this stage.

The sound track area of the film is then fixed by edge application of a special hypo bath to the sound track area only. This may be accomplished by dipping the edge of the film into the hypo solution or by application of the fixing bath by means of an applicator which restricts the solution to the sound track area. The film is then washed and the residual silver halide in the sound track area only is thereby removed leaving residual unexposed silver halide in the picture area of the film.

The film then continues through its regular processing for the production of reversed images in the picture area of the film by selective reexposure and color development of the picture areas. The film is then treated with a bleach solution of an alkali metal ferricyanide, an alkali metal halide, in the usual way, to convert the silver images in both the picture and sound track areas to silver halide.

At this stage in the process, another of the novel features of my invention is performed. The film is treated in a weak hypo for a short period of time of the order of 30 seconds to two minutes to remove the silver halide formed from the colloidal silver of the filter layer and from the silver that was produced as fog in the negative or first developer. This treatment removes only the silver halide produced from the fine grain silver present in the film and does not remove the silver halide of the sound track or of the picture records. This treatment results in clean highlights for the sound track record. The contrast of the sound image may be controlled by the strength of the weak hypo solution used at this point. Treatment in a 2% hypo solution for two minutes, followed by redevelopment, can give a sound track with a maximum density of above 3.0; this is satisfactory for variable area tracks. By using a stronger hypo solution (3%–8%), the maximum density can be reduced to 1.5, which is satisfactory for variable density sound tracks.

After the weak hypo treatment, the sound track record is developed by edge application for about 15 to 30 seconds with a strong black and white developer. This produces a redeveloped positive sound record of metallic silver in the sound track area of the film without affecting the silver halide in the picture area. Treatment of the film is then completed by additional fixing for about two minutes. This removes the silver halide from the picture area of the film. The normal washing and drying operations then follow.

My invention will now be described by reference to the accompanying drawing.

As shown in the first stage of the drawing, a multilayer film having a support 10 of any suitable material, such as cellulose nitrate or cellulose acetate, has coated thereon gelatino silver halide emulsion layers 11, 12 and 13, sensitive, respectively, to the red, green and blue spectral regions. The usual yellow filter layer 14, preferably of colloidal silver, is coated between emulsion layers 12 and 13 to prevent action of blue light on the underlying emulsion layers 11 and 12.

The film is exposed to a natural scene or image, the exposing light being represented by the arrows labeled "blue," "green" and "red." The sound track area is exposed from a negative sound track record and all of the images are developed in a black and white developer to produce the negative silver picture records 15 and positive silver sound record 16. The sound track record 16 is indicated as being in all of the emulsion layers 11, 12 and 13 although the sound record may be restricted to less than all of the emulsion layers by use of exposing light of a suitable color.

The sound track area of the film is then fixed by edge application of a hypo solution to the sound track area, thus removing the residual silver halide from the sound track area while leaving the silver sound record 16 in the film. The film is carried through the usual color development steps to produce a cyan and metallic silver image 17 in the bottom emulsion layer, a magenta and metallic silver 18 in the middle emulsion layer and a yellow and metallic silver image in the top emulsion layer as shown in the second stage of the drawing.

The film is then treated with a ferricyanide and halide bleaching bath such as an alkaline solution of potassium ferricyanide and potassium bromide to convert the metallic silver images to silver bromide. This is followed by a short weak hypo treatment which removes the fine grain silver from the film. After this treatment, as shown in the third stage of the drawing, the film contains positive silver bromide sound image 20, negative silver bromide picture records 21 and cyan and silver bromide image 22, magenta and silver bromide image 25 and yellow and silver bromide image 24 in the corresponding layers of the film. The colloidal silver of the filter layer 14 has been removed leaving a clear gelatin layer, as shown at 25 in the third stage of the drawing. Any fog silver produced in the first developer has also been removed.

The sound track area of the film is then redeveloped by edge application to produce redeveloped silver sound images 26 in the sound area of the film, as shown in the fourth stage of the drawing. The film is then subjected to a longer hypo treatment to remove the silver halide image 21 in the picture areas of the film and the silver halide associated with the dye images 22, 23 and 24. This leaves pure cyan dye image 27 in the bottom layer of the film, magenta dye image 28 in the middle layer of the film and yellow dye image 29 in the top layer of the film, as shown in the fourth stage of the drawing.

The following baths may be used in processing the film according to my invention.

The first or negative developer may have the following composition, the film being developed for approximately 10 minutes at 20° C. in this solution.

| | Grams |
|---|---|
| Monomethyl p-amino phenol sulphate | 6 |
| Hydroquinone | 10 |
| Sodium sulfite | 50 |
| Sodium carbonate | 30 |
| Potassium bromide | 5 |
| Potassium thiocyanate | 0.5 |
| Water to 1 liter. | |

After development of the film in this solution, the sound track area is fixed by edge application in a hypo bath of the following composition:

| | Grams |
|---|---|
| Ammonium thiosulfate | 200 |
| Sodium sulfite | 20 |
| Water to 1 liter. | |

The picture area of the film is then color developed by selective exposure and development, as described, for example, on page 2 of U. S. Patent 2,252,718. The film is then treated in a ferricyanide bleach bath, for example, a bleach bath of the following composition:

| | | |
|---|---|---|
| Potassium ferricyanide | grams | 50 |
| Ammonium hydroxide (28% solution) | cc | 2.5 |
| Potassium bromide | grams | 5 |
| Water to 1 liter. | | |

The film is then fixed for 30 seconds to two minutes in a weak hypo solution of the following composition:

| | Grams |
|---|---|
| Sodium thiosulfate | 20 |
| Sodium sulfite | 1 |
| Water to 1 liter. | |

The sound track record is then redeveloped by edge application for 15 to 30 seconds with a strong black and white developer of the following composition:

| | | |
|---|---|---|
| Sodium sulfite (dessicated) | grams | 80 |
| Hydroquinone | do | 50 |
| Sodium hydroxide | do | 5 |
| Ethylene diamine | cc | 20 |
| Ethyl alcohol | cc | 50 |
| Water to 1 liter. | | |

The treatment of the film in a hypo bath of the usual composition, such as that stated above, is then continued for about two minutes, and the film is washed and dried in the usual way.

Numerous modifications may be made within the scope of my invention which is to be understood as comprising all features falling within the scope of the appended claims.

I claim:

1. The method of producing a positive sound track in a multi-layer photographic film having superposed emulsion layers sensitive, respectively, to different regions of the visible spectrum of which an area is suitable for sound track recording and another area is suitable for picture recording, which comprises forming latent images in the respective areas by exposure of the sound track area to a negative sound image and exposure of the picture area to a positive picture image, developing said latent images in a black-and-white developer to form a positive silver sound track in the sound track area and negative silver picture images in the picture area, removing unexposed silver halide from the sound track area only, selectively exposing the layers to light of a color to which each is sensitive and color developing them to produce positive picture images in the picture areas, treating the film with a solution of potassium ferricyanide and potassium bromide to convert the silver in all layers and areas to silver bromide, subjecting the film to treatment with a weak hypo solution for 30 seconds to two minutes, redeveloping the sound track area only to metallic silver in a black-and-white developer and removing the remaining silver halide from the film.

2. In the production of a positive sound track in a multi-layer photographic film having superposed emulsion layers sensitive, respectively, to different regions of the visible spectrum of which an area is suitable for sound track recording and another area is suitable for picture recording, by forming latent images in the respective areas by exposure of the sound track area to a negative sound image and exposure of the picture area to a positive picture image, developing said latent images in a black-and-white developer to form a positive silver sound track in the sound track area and negative silver picture images in the picture area, removing unexposed silver halide from the sound track area only, selectively exposing the layers to light of a color to which each is sensitive and color developing them to produce positive picture images in the picture areas, treating the film with a solution of an alkali metal ferricyanide and an alkali metal halide to convert the silver in all layers and areas to silver halide, subjecting the film to treatment with a weak hypo solution for approximately 30 seconds to two minutes, redeveloping the sound track area only to metallic silver in a black-and-white developer and removing the remaining silver halide from the film, the method of controlling the contrast of the sound track which comprises varying the concentration of hypo in said weak hypo solution from about 2% to about 8%.

CHARLES H. GUELL.

REFERENCES CITED

The following references are of record in the file of this patent:

UNITED STATES PATENTS

| Number | Name | Date |
|---|---|---|
| 2,178,882 | Schneider | Nov. 7, 1939 |
| 2,220,178 | Schneider | Nov. 5, 1940 |

FOREIGN PATENTS

| Number | Country | Date |
|---|---|---|
| 362,394 | Great Britain | 1931 |
| 362,876 | Great Britain | 1932 |